United States Patent [19]
Wentzek et al.

[11] Patent Number: 5,477,893
[45] Date of Patent: Dec. 26, 1995

[54] KNOT-TYING MECHANISM

[75] Inventors: Horst F. Wentzek, Kenosha, Wis.;
George T. Vattakattu, Dearfield, Ill.

[73] Assignee: Frank L. Wells Company, Kenosha, Wis.

[21] Appl. No.: 301,801

[22] Filed: Sep. 7, 1994

[51] Int. Cl.$^6$ .................................................. B21F 15/00
[52] U.S. Cl. ........................ 140/101; 140/115; 289/2; 289/18.1
[58] Field of Search ...................... 140/101, 115, 140/92.7, 103; 289/2, 10, 18.1

[56] References Cited

U.S. PATENT DOCUMENTS

| | | | |
|---|---|---|---|
| 2,166,636 | 7/1939 | Marcus et al. | 140/101 |
| 2,333,797 | 11/1943 | Kirchner | 140/101 |
| 2,759,500 | 8/1956 | Nelson | 140/101 |
| 2,836,205 | 5/1958 | Wonderlich | 140/101 |
| 3,043,347 | 7/1962 | Piliero | 140/101 |

*Primary Examiner*—C. D. Crowder
*Assistant Examiner*—Michael A. Neas
*Attorney, Agent, or Firm*—Michael, Best & Friedrich

[57] ABSTRACT

Disclosed herein is a coil spring knotting machine comprising a frame, a support arm mounted on the frame for movement between a knot-tying position and a retracted position, a camshaft rotatably mounted on the frame about an axis fixed relative to the frame, a rocker-arm moveably mounted on the frame and operably connected to the camshaft and to the support arm for displacing the support arm between the knot-tying and retracted positions in response to rotation of the camshaft, a first servo motor rotatably drivingly connected to the camshaft to selectively effect rotation thereof, a knot-tying member rotatably mounted on the support arm, a second shaft rotatably mounted on the frame about a second axis fixed relative to the frame, a coupling drivingly connected to the second shaft and to the knot-tying member for rotating the knot-tying member in response to rotation of the second shaft, notwithstanding movement of the support arm between the knot-tying and retracted positions, a second servo motor drivingly connected to the second shaft to effect rotation thereof, and an electronic control unit connected to the first and second servo motors to cyclically rotate the camshaft so as to displace the support arm between the knot-tying and retracted positions and to cyclically rotate the second shaft so as to rotate the knot-tying member when the support arm is in the knot-tying position.

9 Claims, 6 Drawing Sheets

KNOT-TYING MECHANISM

BACKGROUND OF THE INVENTION

The invention relates generally to machines or mechanisms for knotting the free ends of a coil spring to the adjacent end convolution of the coil spring.

In prior machines, the knot-tying operation of the machine was powered and driven through a single camshaft assembly which was cyclically operated by a one revolution mechanical clutch which was spring biased, and pneumatically operated, and excessively noisy.

Furthermore, the knot-tying or twisting member (to be described hereinafter) was driven from the camshaft by a partial gear, i.e., a gear which had only a limited arcuate range of teeth, which partial gear was removably fixed on the camshaft for periodic driving actuation of the knot-tying or twisting member.

As a consequence, when it was desired to change the size of the knot, i.e., to vary the number of turns therein, it was necessary to at least partially disassemble the camshaft assembly to permit removal of one partial gear and then to reassemble the camshaft assembly with another partial gear.

Such disassembly and reassembly resulted in appreciable machine down time and was also labor intensive. Thus, it was expensive to disassemble and reassemble the camshaft assembly to vary the number of turns in the knot.

SUMMARY OF THE INVENTION

The invention provides a coil spring knotting machine comprising a frame, a support arm mounted on the frame for movement between a knot-tying position and a retracted position, a first shaft rotatably mounted on the frame about an axis fixed relative to the frame, a mechanism moveably mounted on the frame and operably connected to the first shaft and to the support arm for displacing the support arm between the knot-tying and retracted positions in response to rotation of the first shaft, a first servo motor rotatably drivingly connected to the first shaft to selectively effect rotation thereof, a knot-tying member rotatably mounted on the support arm, a second shaft rotatably mounted on the frame about a second axis fixed relative to the frame, a coupling drivingly connected to the second shaft and to the knot-tying member for rotating the knot-tying member in response to rotation of the second shaft, notwithstanding movement of the support arm between the knot-tying and retracted positions, a second servo motor drivingly connected to the second shaft to effect rotation thereof, and an electronic control unit connected to the first and second servo motors to cyclically rotate the first shaft so as to displace the support arm between the knot-tying and retracted positions and to cyclically rotate the second shaft so as to rotate the knot-tying member when the support arm is in the knot-tying position.

The invention also provides a coil spring knotting machine comprising a frame, a camshaft mounted on the frame about an axis fixed relative to the frame, a support arm mounted on the camshaft for movement between a knot-tying position and a retracted position, a rocker arm moveably mounted on the frame and operably connected to the camshaft and to the support arm for displacing the support arm between the knot-tying and retracted positions in response to rotation of the camshaft, a first servo motor rotatably drivingly connected to the camshaft to selectively effect rotation thereof, a knot-tying member rotatably mounted on the support arm about an axis fixed relative to the support arm, a drive shaft rotatably mounted on the frame about a second axis fixed relative to the frame, a driven shaft which is supported for rotation by the support arm about an axis fixed relative to the support arm and which is drivingly connected to the knot-tying member to effect rotation thereof in response to rotation of the driven shaft, the driven shaft being generally aligned with the drive shaft when the support arm is in the knot-tying position and being misaligned when the support arm is in the retracted position, a coupling drivingly connected to the drive shaft and to the driven shaft for rotating the knot-tying member in response to rotation of the drive shaft, the coupling maintaining driving connection between the drive shaft and the driven shaft notwithstanding movement of the support arm between the knot-tying and retracted positions, a second servo motor drivingly connected to the drive shaft to effect rotation thereof, and an electronic control unit connected to the first and second servo motors to cyclically rotate the camshaft so as to displace the support arm between the knot-tying and retracted positions and to cyclically rotate the drive shaft so as to rotate the knot-tying member when the support arm is in the knot-tying position, the electronic control unit including adjustment means for varying the amount of knot-tying rotation of the knot-tying member.

Other features and advantages of this invention will become apparent to those skilled in the art upon review of the following detailed description, claims and drawings.

Before one embodiment of the invention is explained in detail, it is to be understood that the invention is not limited in its application to the details of the construction and the arrangements of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

GENERAL DESCRIPTION

Figure 1:
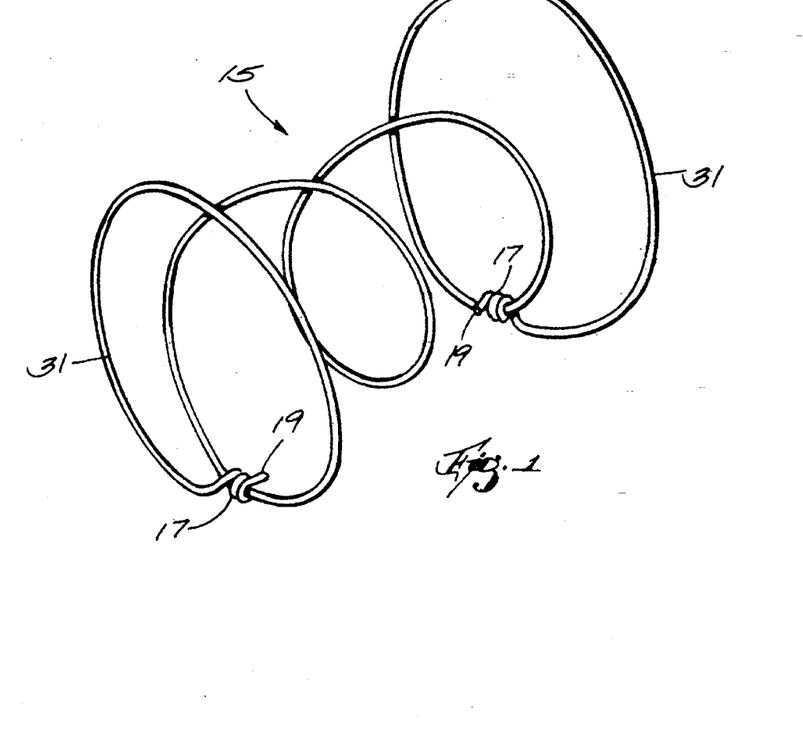
FIG. 1 is a perspective view of a knotted helical coil spring.

The drawings are illustrative of a machine 11 which is operative to twist the free ends of (see FIG. 1) a helical coil spring 15 to obtain, at each end, a knot 17. In practice, both free ends 19 are simultaneously twisted to obtain the end knots 17 by generally identical mechanisms which are included in the machine 11. Accordingly, only one of such mechanisms will be described.

Figure 2:
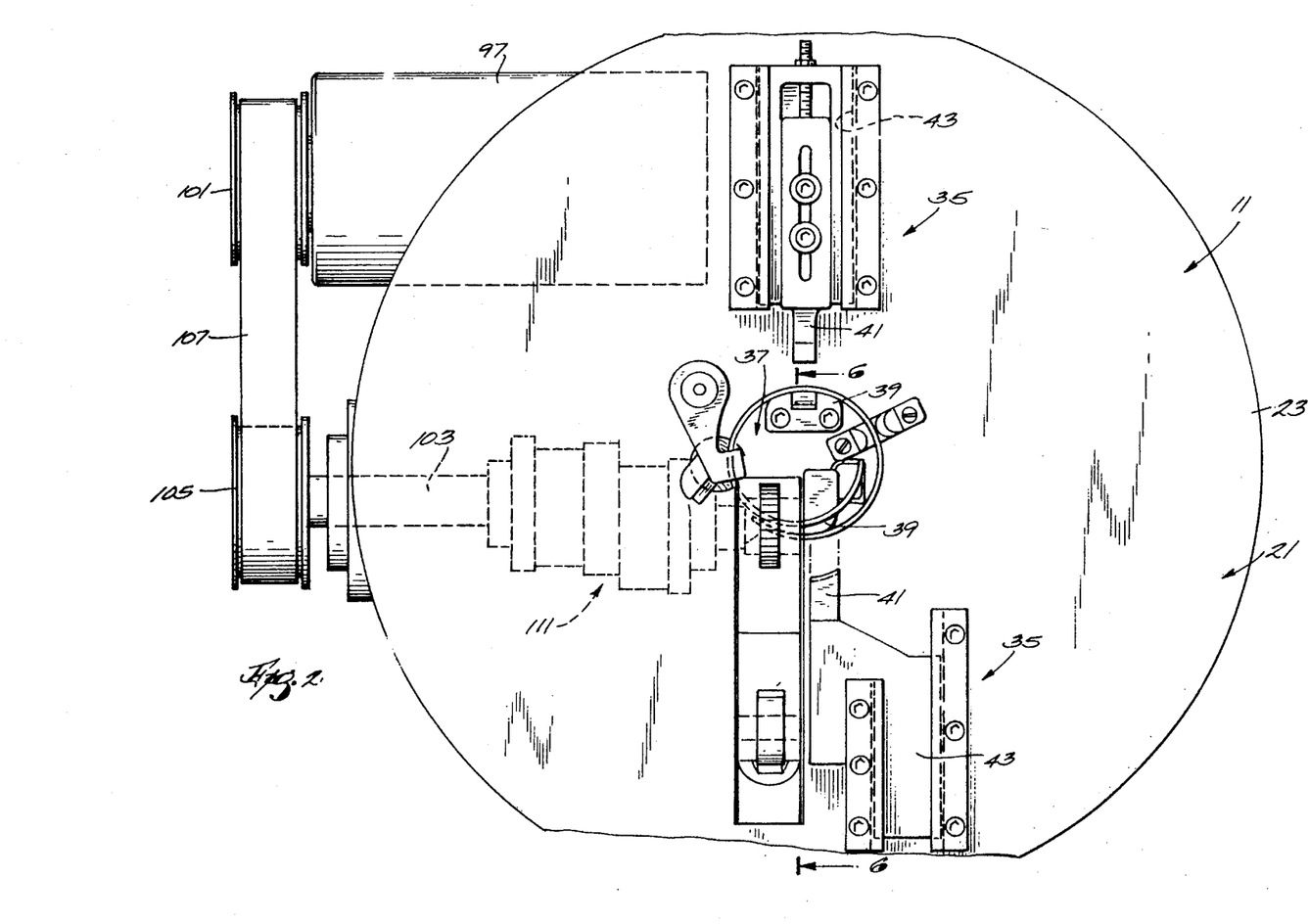
FIG. 2 is an elevational view, with certain parts omitted, of a machine for manufacturing the knots of the helical coil spring shown in FIG. 1, which machine incorporates various of the features of the invention.
Figure 3:
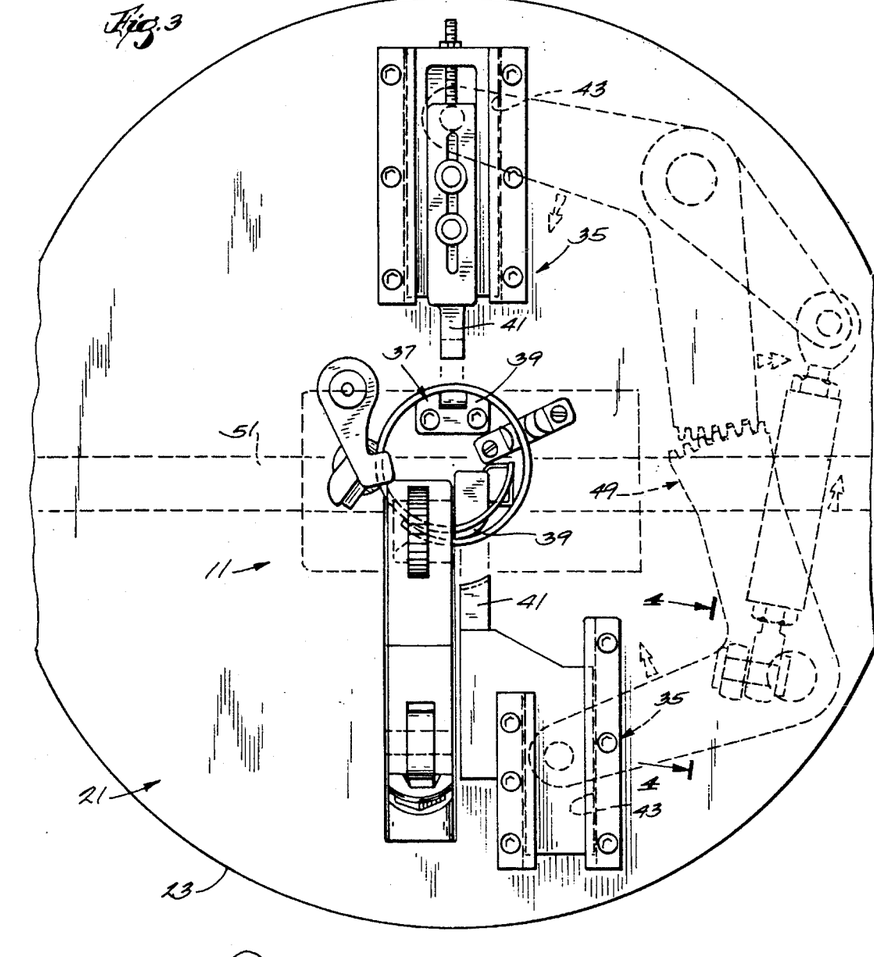
FIG. 3 is a view similar to FIG. 2 with certain parts omitted and with other additional parts shown.
Figure 5:
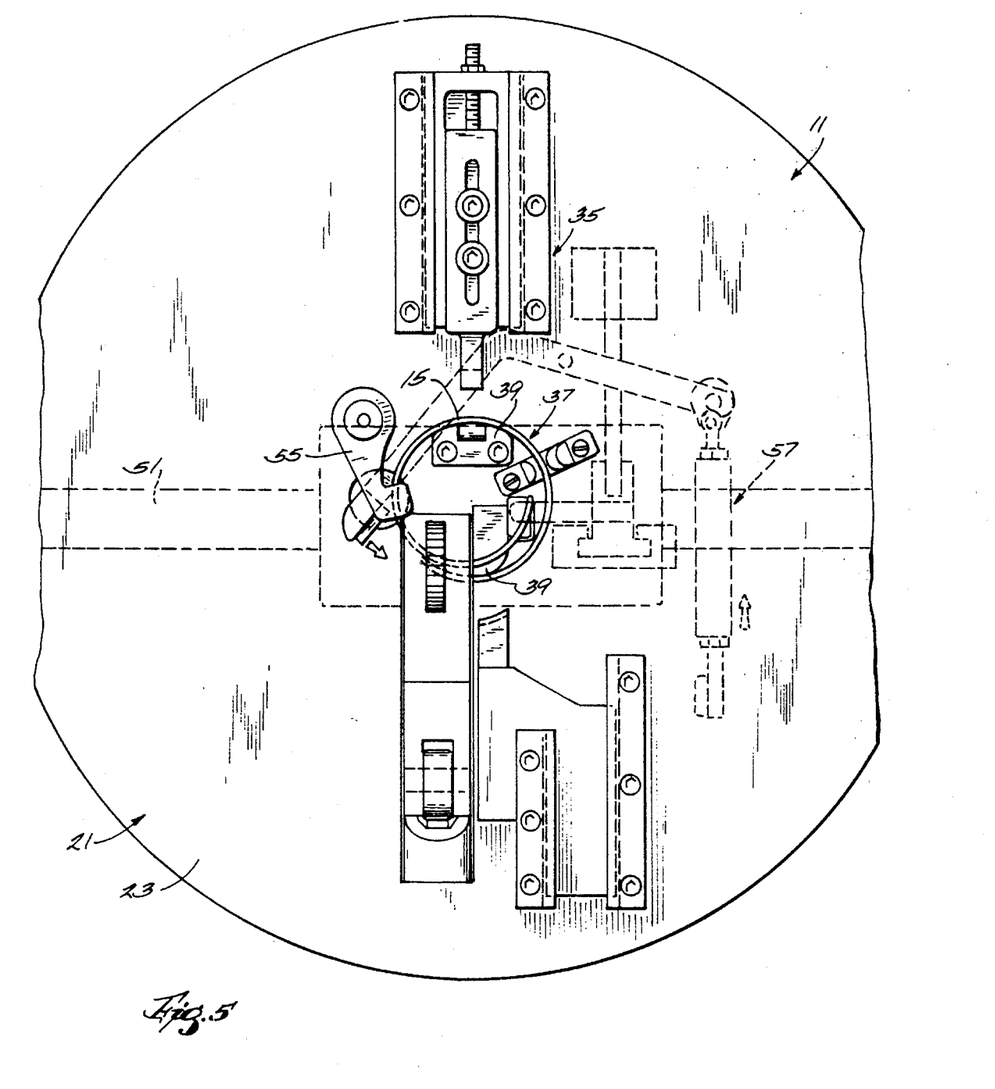
FIG. 5 is a view similar to FIG. 3 with certain parts omitted and with other additional parts shown.

Referring to FIGS. 2, 3 and 5, the machine 11 comprises a frame 21 which includes spaced and parallel end members 23 and 24 which can be of any shape, which, in the disclosed construction, are generally circular in shape, and which are rigidified by a plurality of cross members 25 fixedly connected thereto.

Prior to twisting of a free end 19 to produce an end knot 17, an end coil spring convolusion 31, adjacent the free end 19, is grasped and clamped by the machine 11 to hold the end convolusion 31 of the coil spring 15 securely in place. Thus, the machine 11 includes (see FIGS. 2 and 3) gripping or clamping means 35 comprising a segmented support 37 which is fixed on the end member 23 and which includes a pair of fixed anvil or clamping block portions 39, and a pair of movable clamps or jaws 41 which are respectively linearly reciprocal along suitable guides 43 fixed on the end member 23 and relative to the anvil portions 39 so as to clamp generally oppositely disposed portions of the end convolution 31 of the coil spring 15 in fixed position about the support 37 and on the end member 23 of the frame 21.

Figure 4:
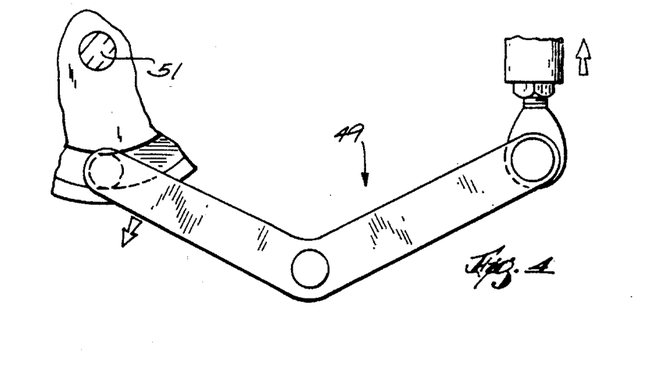
FIG. 4 is a fragmentary sectional view taken along line 4—4 of FIG. 3.

The clamps or jaws 41 are displaced between clamping and retracted positions by (see FIG. 3) a cam driven mechanism 49 which includes (see FIG. 4) a camshaft 51 supported for rotation on the frame 21.

The machine 11 also includes (see FIG. 5) a stop member 55 which is movable into the path of the adjacent free end 19 of the coil spring 15 to properly locate the free end 19 of the coil spring 15 to enable twisting thereof about the adjacent portion of the end convolution 31 to produce the knot 19 with a desired number of turns, and therefore to adjustably control the length of the extending free end 19 of the coil spring 15.

The stop member 55 is displaceable between a stop position and a retracted position by a cam driven mechanism 57 which includes the before-mentioned camshaft 51.

Figure 6:
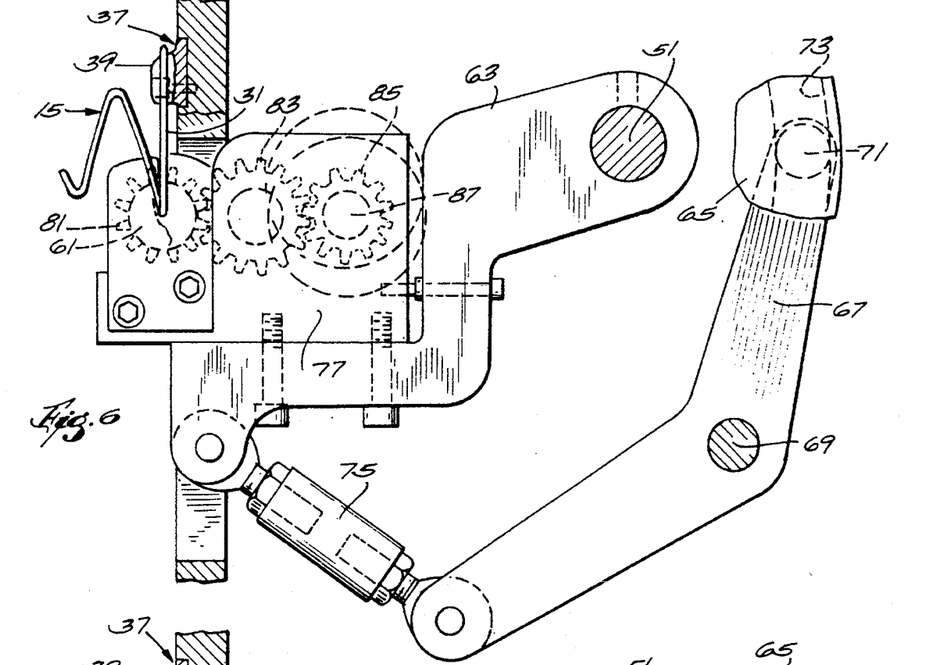
FIG. 6 is a fragmentary sectional view taken along line 6—6 of FIG. 2, and illustrating a knot twisting mechanism in a knot-tying or twisting position.
Figure 7:
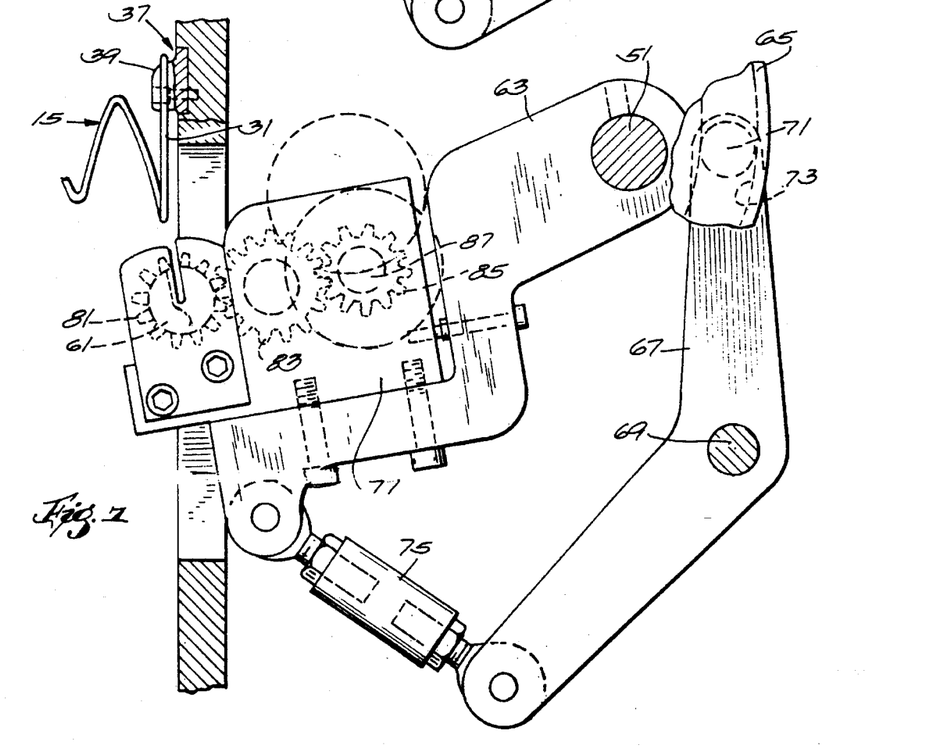
FIG. 7 is a view similar to FIG. 6 and illustrating certain other components of the knot twisting mechanism in a retracted position.

When the coil spring 15 is clamped in proper position for the knot-tying operation, a knot-tying or twisting member or knotting gear 61 (shown in FIG. 11) is moved from a retracted position (shown in FIG. 7) into an operative knot-tying or twisting position (shown in FIG. 6) and rotated to produce the knot 17.

More particularly, the knot-tying or twisting member 61 is rotatably supported on a support arm 63 which is rotatably mounted on the before-mentioned camshaft 51 which also carries a support arm driving cam 65.

The support arm 63 is displacable between a knot-tying or twisting position and a retracted position by any suitable mechanism which, in the disclosed construction, takes the form of a rocker-arm linkage including a rocker arm 67 which, intermediate the ends thereof, is pivotally mounted on the frame 21 about a stud 69, which, at one end, has fixed thereto a cam roller 71 operable in a cam slot 73 in the support arm driving cam 65 on the camshaft 51, and which, at the other end thereof, is pivotally connected to one end of a connecting link 75 which, at the other end thereof, is pivotally connected to the support arm 63.

Rotation of the camshaft 51 thus moves the support arm 63 between the knot-tying or twisting position and the retracted position.

Fixedly mounted on the support arm 63 is a subframe 77 which supports the knot-tying or twisting member 61 for rotation about an axis fixed relative to the support arm 63.

The knot-tying or twisting member 61 includes (see FIG. 11) a gear portion 81 which meshes with an idle gear 83 which is supported on the subframe 77 for rotation about an axis fixed relative to the subframe 77 (and relative to the support arm 63). In turn, the idle gear 83 is in mesh with a drive gear 85 which is fixedly mounted on a driven shaft 87 journaled for rotation by the subframe 77 about an axis fixed relative to the subframe 77 (and relative to the support arm 63).

Figure 11:
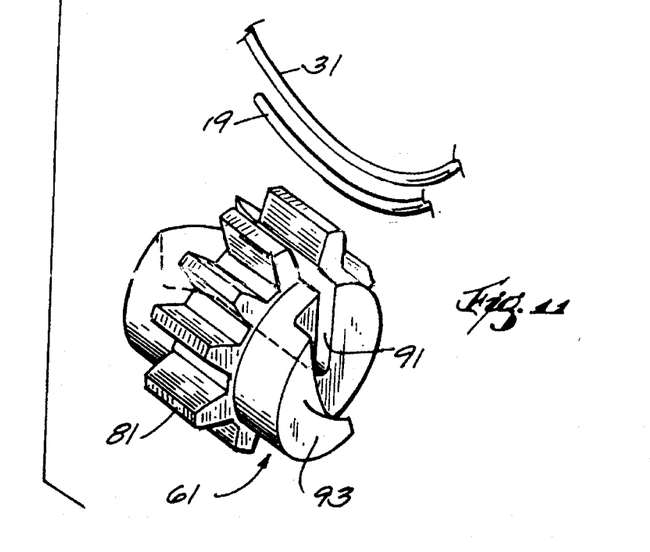
FIG. 11 is a perspective view of the knot-tying or twisting member employed in the machine shown in FIG. 2.

As shown in FIG. 11, the knot-tying or twisting member 61 also includes an axial slot 91 which extends from the rotational axis thereof and which is adapted to receive the adjacent portion of the adjacent end convolution 31 of the coil spring 15 when the knot-tying or twisting member 61 is moved into the knot-tying position, thereby to permitting rotation of the knot-tying or twisting member 61 about the adjacent portion of the adjacent end convolution 31.

The knot-tying or twisting member 61 also includes a raised portion 93 which engages the adjacent free end 19 of the adjacent end convolution 31 and which, in response to rotation of the knot-tying or twisting member 61 about the adjacent portion of the end convolution 31, bends the free end 19 around the end convolution 31 to a variably adjustable predetermined number of degrees, i.e., from one turn, to two and a half or more turns.

When the knot-tying operation is complete, the knot-tying or twisting member 61 is withdrawn from the end convolution 31. It is, of course, apparent that, during movement of the knot-tying or twisting member 61 to and from the knot-tying position, the slot 91 must be aligned with the wire of the end convolution 31 to accept receipt of the adjacent portion of the end convolution 31 and to permit withdrawal of the end convolution 31 from the slot 91 in the knot-tying or twisting member 61 when the knot-tying or twisting member 61 is moved from the knot-tying position.

As above described the construction is conventional.

In order to obtain the advantages of the invention, the driven shaft 87 is rotatably driven by (see FIGS. 2 and 8) a suitable first servo motor 97 which is fixed on the frame 21 and, in particular, on one of the cross members 25 and which includes an output shaft 99 having thereon a drive pulley 101. Rotatably mounted the one cross member 25 about an axis fixed relative thereto is a drive shaft 103 which, at one end, fixedly carries a driven pulley 105 which is connected to the drive pulley, 101 by a suitable timing belt 107.

When the support arm 63 is in the knot-tying or twisting position, the axes of the drive shaft 103 and of the driven shaft 87 are generally aligned. However, when the support arm 63 is moved to the retracted position, the axes of the drive shaft 103 and of the driven shaft 87 are misaligned. In order to provide for continuing drive connection between the drive shaft 103 and the driven shaft 87, notwithstanding movement of the support arm 63 between the knot-tying or twisting position and the retracted position, the drive shaft 103 and the driven shaft 87 are connected by (see FIG. 2) a suitable coupling 111 which is capable of maintaining the drive connection between the drive shaft 103 and the driven shaft 87, notwithstanding variable misalignment therebetween.

While other couplings can be employed, the disclosed construction employs, as the coupling 111, a Schmidt Offset Coupling, Part No.L 230, manufactured by Zero-Max, a unit of Barry Wright of 2845 Harriet Avenue, Minneapolis, Minn.

The before-mentioned camshaft 51 is driven independently of the knot-tying or twisting member 61 and through a one revolution cycle by (see FIG. 8) a suitable second servo motor 121 which is also suitably fixed to the frame 21, as by connection to one of the cross members 25, and which includes an output shaft 123 having fixed thereon a drive pulley 125 which, through a suitable timing belt 127, drives a driven pulley 129 mounted on the camshaft 51. Accordingly, the camshaft 51 is repetitiously driven through one revolution cycles by the second servo motor 121.

Figure 8:
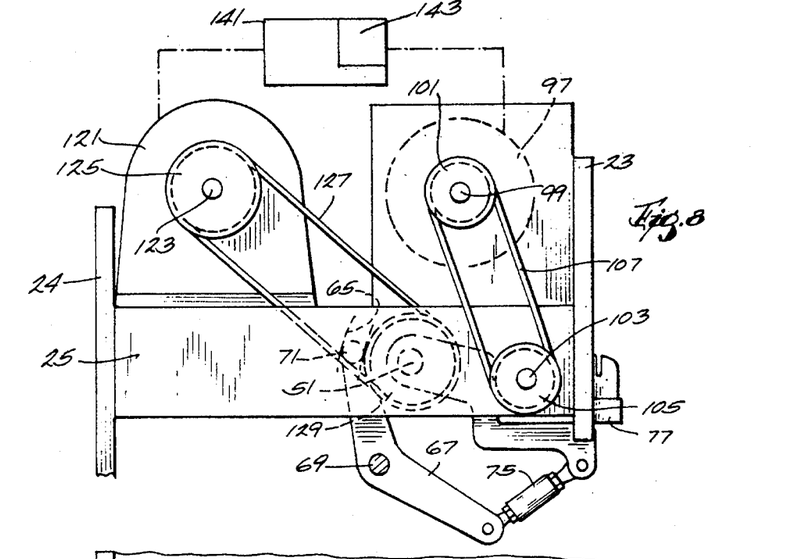
FIG. 8 is a reduced and partially schematic elevational view (taken at a right angle to the views of FIGS. 2, 4, and 5) and illustrating certain other of the components of the machine shown in FIG. 2.
Figure 9:
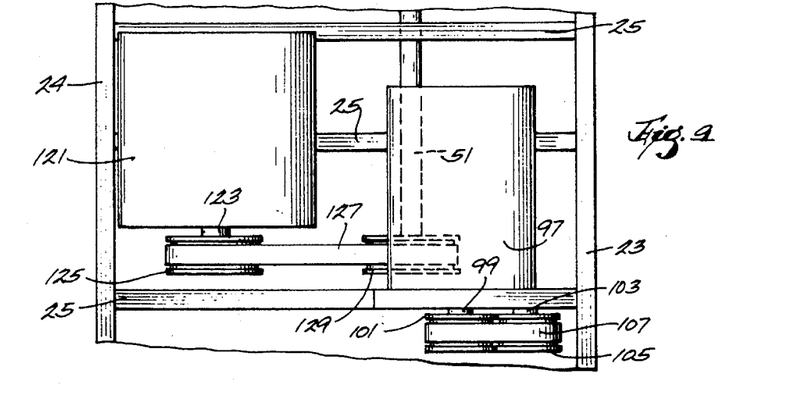
FIG. 9 is a top view of the components shown in FIG. 8.

The first and second servo motors 97 and 121 are electrically connected to and controlled by an electronic control circuit which includes an electronic control unit 141 which is shown diagrammatically in FIG. 8 and which is arranged to actuate the first servo motor 97 in proper timed relation to the one revolution cycle of the second servo motor 121. The construction of the electronic control unit 141 is believed to be well within ordinary skill in the art and, thus, a detailed description of the physical arrangement thereof is believed to be unnecessary.

The electronic control unit 141 includes a schematically-illustrated adjustment means 143 for determining the number of knot-tying revolutions of the knot-tying or twisting member 61, i.e., for one, two, or three revolutions, so as thereby, at least in part, to determine the size of the resulting knot 17. Any suitable means known in the art can be employed to affect such adjustment in the electronic control unit 141.

Use of the disclosed construction, including the first and second servo motors 97 and 121, and the electronic control unit 141, facilitates knot manufacture with a variable number of turns depending upon entry into the control unit 141 of variation in the input to the adjustment means 143.

The disclosed construction provides control of the rotary operation of the knot-tying or twisting member 61 independently of the control of the rotary operation of the camshaft 51 by employment of the first and second servo motors 97 and 121 and serves to eliminate the excessive noise created by the prior art machines due to prior noisy operation of the before mentioned prior art one revolution mechanical clutch. In addition, the disclosed construction serves to permit variation in construction of the knots 17 by varying the input to the adjustment means 143 of the control unit 141 and without requiring replacement of the before mentioned partial gear in the machine. Still further, the disclosed construction is less expensive then prior arrangements.

Figure 10:
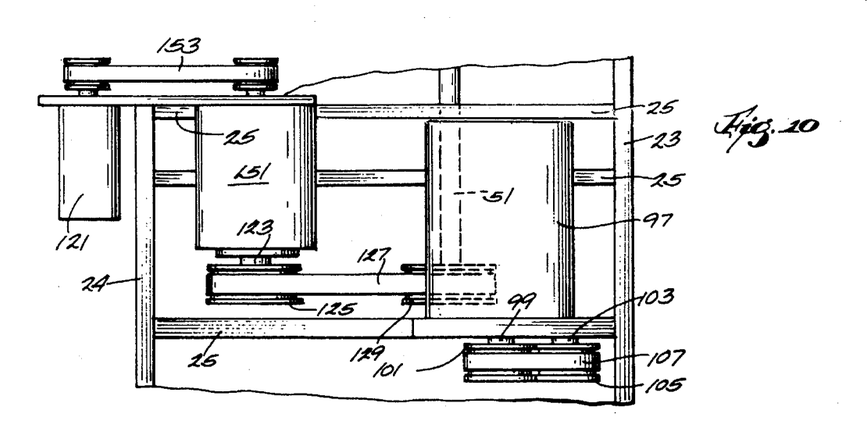
FIG. 10 is a view similar to FIG. 9 and illustrating an alternate or modified embodiment of the invention.

If desired, and as shown in FIG. 10, the camshaft 51 can be directly driven by a hydraulic motor 151 which, in turn, can be driven through a suitable drive, such as a timing belt 153, from the second servo motor 121. Alternately or in addition, the drive shaft 103 can be directly driven by a hydraulic motor (not shown) which, in turn, can be driven through a suitable drive from the first servo motor 97.

Various of the features of the invention are set forth in the following claims.

We claim:

1. A coil spring knotting machine comprising a frame, a support arm mounted on said frame for movement between a knot-tying position and a retracted position, a first shaft rotatably mounted on said frame about an axis fixed relative to said frame, a mechanism moveably mounted on said frame and operably connected to said first shaft and to said support arm for displacing said support arm between said knot-tying and retracted positions in response to rotation of said first shaft, a first servo motor rotatably drivingly connected to said first shaft to selectively effect rotation thereof, a knot-tying member rotatably mounted on said support arm, a second shaft rotatably mounted on said frame about a second axis fixed relative to said frame, a coupling drivingly connected to said second shaft and to said knot-tying member for rotating said knot-tying member in response to rotation of said second shaft, notwithstanding movement of said support arm between said knot-tying and retracted positions, a second servo motor drivingly connected to said second shaft to effect rotation thereof, and an electronic control unit connected to said first and second servo motors to cyclically rotate said first shaft so as to displace said support arm between said knot-tying and retracted positions and to cyclically rotate said second shaft so as to rotate said knot-tying tying member when said support arm is in said knot-tying position.

2. A coil spring knotting machine in accordance with claim 1 wherein said support arm is pivotally mounted on said first shaft.

3. A coil spring knotting machine in accordance with claim 1 and further including a hydraulic motor intermediate one of said connected first servo motor and said first shaft and said connected second servo motor and said second shaft.

4. A coil spring knotting machine in accordance with claim 1 and further including a driven shaft which is supported for rotation by said support arm about an axis fixed relative to said support arm and which is drivingly connected to said knot-tying member to effect rotation thereof in response to rotation of said driven shaft.

5. A coil spring knotting machine in accordance with claim 4 wherein said second shaft and said driven shaft are generally aligned when said support arm is in said knot-tying position and are misaligned when said support arm is in said retracted position.

6. A coil spring knotting machine in accordance with claim 5 wherein said coupling maintains said second shaft and said driven shaft in driving connection notwithstanding misalignment therebetween.

7. A coil spring knotting machine in accordance with claim 1 wherein said electronic control unit includes an adjustment means for varying the amount of rotation of said knot-tying member.

8. A coil spring knotting machine comprising a frame, camshaft mounted on said frame about an axis fixed relative to said frame, a support arm mounted on said camshaft for movement between a knot-tying position and a retracted position, a rocker arm moveably mounted on said frame and operably connected to said camshaft and to said support arm for displacing said support arm between said knot-tying and retracted positions in response to rotation of said camshaft, a first servo motor rotatably drivingly connected to said camshaft to selectively effect rotation thereof, a knot-tying member rotatably mounted on said support arm about an axis fixed relative to said support arm, a drive shaft rotatably mounted on said frame about a second axis fixed relative to said frame, a driven shaft which is supported for rotation by said support arm about an axis fixed relative to said support arm and which is drivingly connected to said knot-tying member to effect rotation thereof in response to rotation of said driven shaft, said driven shaft being generally aligned with said drive shaft when said support arm is in said knot-tying position and being misaligned when said support arm is in said retracted position, a coupling drivingly connected to said drive shaft and to said driven shaft for rotating said knot-tying member in response to rotation of said drive shaft, said coupling maintaining driving connection between said drive shaft and said driven shaft notwithstanding movement of said support arm between said knot-tying and retracted positions, a second servo motor drivingly connected to said drive shaft to effect rotation thereof, and an electronic control unit connected to said first and second servo motors to cyclically rotate said camshaft so as to displace said support arm between said knot-tying and retracted positions and to cyclically rotate said drive shaft so as to rotate said knot-tying member when said support arm is in said knot-tying position, said electronic control unit including adjustment means for varying the amount of knot-tying rotation of said knot-tying member.

9. A coil spring knotting machine in accordance with claim 8 and further including a hydraulic motor intermediate one of said connected first servo motor and said first shaft and said connected second servo motor and said second shaft.

* * * * *